(12) United States Patent
Smolic et al.

(10) Patent No.: US 9,036,089 B2
(45) Date of Patent: May 19, 2015

(54) PRACTICAL TEMPORAL CONSISTENCY FOR VIDEO APPLICATIONS

(71) Applicant: Disney Enterprises, Inc., Burbank, CA (US)

(72) Inventors: Aljosa Aleksej Andrej Smolic, Zurich (CH); Oliver Wang, Zurich (CH); Manuel Lang, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 315 days.

(21) Appl. No.: 13/686,684

(22) Filed: Nov. 27, 2012

(65) Prior Publication Data
US 2014/0146235 A1    May 29, 2014

(51) Int. Cl.
*H04N 5/14*    (2006.01)

(52) U.S. Cl.
CPC ............... *H04N 5/147* (2013.01); *H04N 5/145* (2013.01)

(58) Field of Classification Search
CPC ......... H04N 5/144; H04N 5/21; H04N 7/012; H04N 5/145; H04N 5/147; H04N 7/50; H04N 7/26765; H04N 7/26244; H04N 7/26015; G06T 2207/10016; G06T 7/2013; G06T 7/364; G06T 9/008

USPC .......................... 348/699–701, 620; 382/197; 375/240.16, 240.22, 240.29
IPC .................................. H04N 5/14,5/21
See application file for complete search history.

(56) References Cited

U.S. PATENT DOCUMENTS 5,600,731 A * 2/1997 Sezan et al. .................. 348/620
6,281,942 B1 * 8/2001 Wang ............................ 348/620

* cited by examiner

*Primary Examiner* — Sherrie Hsia
(74) *Attorney, Agent, or Firm* — Patent Ingenuity, P.C.; Samuel K. Simpson

(57) ABSTRACT

A video sequence having a plurality of frames is received. A feature in a first frame from the plurality of frames and a first position of the feature in the first frame are detected. The position of the feature in a second frame from the plurality of frames is estimated to determine a second position. A displacement vector between the first position and the second position is also computed. A plurality of content characteristics is determined for the first frame and the second frame. The displacement vector is spatially diffused with a spatial filter over a frame from the plurality of frames to generate a spatially diffused displacement vector field. The spatial filter utilizes the plurality of content characteristics. A temporal filter temporally diffuses over a video volume the spatially diffused displacement vector field to generate a spatiotemporal vector field. The temporal filter utilizes the plurality of content characteristics.

32 Claims, 9 Drawing Sheets
(4 of 9 Drawing Sheet(s) Filed in Color)

PRACTICAL TEMPORAL CONSISTENCY FOR VIDEO APPLICATIONS

BACKGROUND

1. Field

This disclosure generally relates to the field of image processing. More particularly, the disclosure relates to video applications.

2. General Background

Image processing is generally the area in which computing devices are utilized to process acquired images or generated images. The images may be acquired, e.g., through a camera, or generated based upon a model. Various computer graphics hardware and software packages may be utilized by a user to provide and manipulate data of an image. As a result, computer graphics hardware and software have aided graphics designers in the development of graphic intensive products such as movies, television shows, video games, and/or the like.

A video sequence may generally be referred to as a series of image frames. Displaying the series of image frames sequentially may result in a video such as a movie, television show, video game, and/or the like. Various computational complexities may arise when considering multiple video frames simultaneously. Such computational complexities may involve more computational and/or memory resources compared to processing a single image. The computational complexities are further enhanced if energy minimization techniques are employed. As a result, potential inconsistencies may occur during the display of the frames as a video. For example, artifacts such as ambiguities may appear during a display of a video. In other words, many image-based graphics applications are currently not temporally consistent. Although image-based computer graphics applications have been helpful for displaying and manipulating images, the practicality of utilizing image-based computer graphics applications for a video sequence is often limited.

SUMMARY

In one aspect of the disclosure, a computer program product is provided. The computer program product includes a computer readable medium having a computer readable program stored thereon. The computer readable program when executed on a computer causes the computer to receive a video sequence having a plurality of frames. Further, the computer readable program when executed on the computer causes the computer to detect a feature in a first frame from the plurality of frames and a first position of the feature in the first frame. In addition, the computer readable program when executed on the computer causes the computer to estimate the position of the feature in a second frame from the plurality of frames to determine a second position. The computer readable program when executed on the computer also causes the computer to compute a displacement vector between the first position and the second position. Further, the computer readable program when executed on the computer causes the computer to determine a plurality of content characteristics for the first frame and the second frame. In addition, the computer readable program when executed on the computer causes the computer to spatially diffuse the displacement vector with a spatial filter over a frame from the plurality of frames to generate a spatially diffused displacement vector field. The spatial filter utilizes the plurality of content characteristics. The computer readable program when executed on the computer also causes the computer to temporally diffuse over a video volume, with a temporal filter, the spatially diffused displacement vector field to generate a spatiotemporal vector field. The temporal filter utilizes the plurality of content characteristics.

In another aspect of the disclosure, a computer program product is provided. The computer program product includes a computer readable medium having a computer readable program stored thereon. The computer readable program when executed on a computer causes the computer to receive a video sequence having a plurality of frames. Further, the computer readable program when executed on the computer causes the computer to receive a spatiotemporal displacement vector field. In addition, the computer readable program when executed on the computer causes the computer to receive data. The computer readable program when executed on the computer also causes the computer to determine a plurality of content characteristics for a first frame and a second frame in the plurality of frames. Further, the computer readable program when executed on the computer causes the computer to spatially diffuse the data with a spatial filter a frame to generate a spatially diffused data field. The spatial filter utilizes the plurality of content characteristics. Further, the computer readable program when executed on the computer causes the computer to temporally diffuse over a video volume, with a temporal filter, the spatially diffused data field along a motion path determined by the spatiotemporal displacement vector field to generate a spatiotemporal data field, the temporal filter utilizing the plurality of content characteristics.

In yet another aspect of the disclosure, a process is provided. The process receives a video sequence having a plurality of frames. Further, the process detects a feature in a first frame from the plurality of frames and a first position of the feature in the first frame. In addition, the process estimates the position of the feature in a second frame from the plurality of frames to determine a second position. The process also computes a displacement vector between the first position and the second position. Further, the process determines a plurality of content characteristics for the first frame and the second frame. In addition, the process spatially diffuses the displacement vector with a spatial filter over a frame from the plurality of frames to generate a spatially diffused displacement vector field. The spatial filter utilizes the plurality of content characteristics. The process also temporally diffuses over a video volume, with a temporal filter, the spatially diffused displacement vector field to generate a spatiotemporal vector field. The temporal filter utilizes the plurality of content characteristics.

In another aspect of the disclosure, a system is provided. The system comprises a processor that receives a video sequence having a plurality of frames, detects a feature in a first frame from the plurality of frames and a first position of the feature in the first frame, estimates the position of the feature in a second frame from the plurality of frames to determine a second position, computes a displacement vector between the first position and the second position, determines a plurality of content characteristics for the first frame and the second frame, spatially diffuses the displacement vector with a spatial filter over a frame from the plurality of frames to generate a spatially diffused displacement vector field, and temporally diffuses over a video volume, with a temporal filter, the spatially diffused displacement vector field to generate a spatiotemporal vector field. The spatial filter utilizes the plurality of content characteristics. The temporal filter utilizes the plurality of content characteristics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned features of the present disclosure will become more apparent with reference to the following description taken in conjunction with the accompanying drawings, wherein like reference numerals denote like elements and in which.

DETAILED DESCRIPTION

A computer program product, method, and system may be utilized to provide temporal consistency to a variety of image-based computer graphics applications. A memory and computationally efficient methodology is utilized to enable practical temporal consistency for a relatively long video sequence. Such temporal consistency results in temporal smoothness in the resulting video sequence. As a result, the overall quality of a video sequence generated through an image-based computer graphics application is improved.

A spatiotemporal filter is utilized to filter data in a video sequence by space and time. In contrast with approaches that utilize a single frame at a time of a video sequence, the spatiotemporal filter is applied by utilizing information from neighboring frames of a video sequence. In other words, multiple frames of a video sequence may be filtered simultaneously. In one aspect, the spatiotemporal filter comprises a spatial filter and a temporal filter. As an example, the spatial filter may comprise a one-dimensional x axis filter and a one-dimensional y axis filter. As another example, the temporal filter may include a one-dimensional time axis filter.

Global optimization of a video sequence may be achieved with the spatiotemporal filtering approach in image-based computer graphics applications that have sparse error terms, resulting from information not existing at every pixel in a frame, and global smoothness regularization. Such image-based computer graphics applications include, but are not limited to, optical flow, depth/disparity estimation, colorization, low resolution data upscaling, and scribble propagation.

In contrast with previous approaches that at most work on image pairs and do not scale well for video sequences to achieve temporal stability, the spatiotemporal filtering approach enforces temporal stability in a computationally efficient manner with relatively low memory usage for video sequences. In other words, the spatiotemporal filtering approach allows existing image processing methods to be practically applied to video applications. For example, the average shot length in many modern movies and television shows is in the range of four to six seconds. That shot length typically includes a sequence of hundreds of frames. The spatiotemporal filtering approach allows for existing image processing methods to be utilized in a computationally efficient manner for a relatively long sequence of frames, whereas previous approaches are limited to usage for a small quantity of frames.

Figure 1:
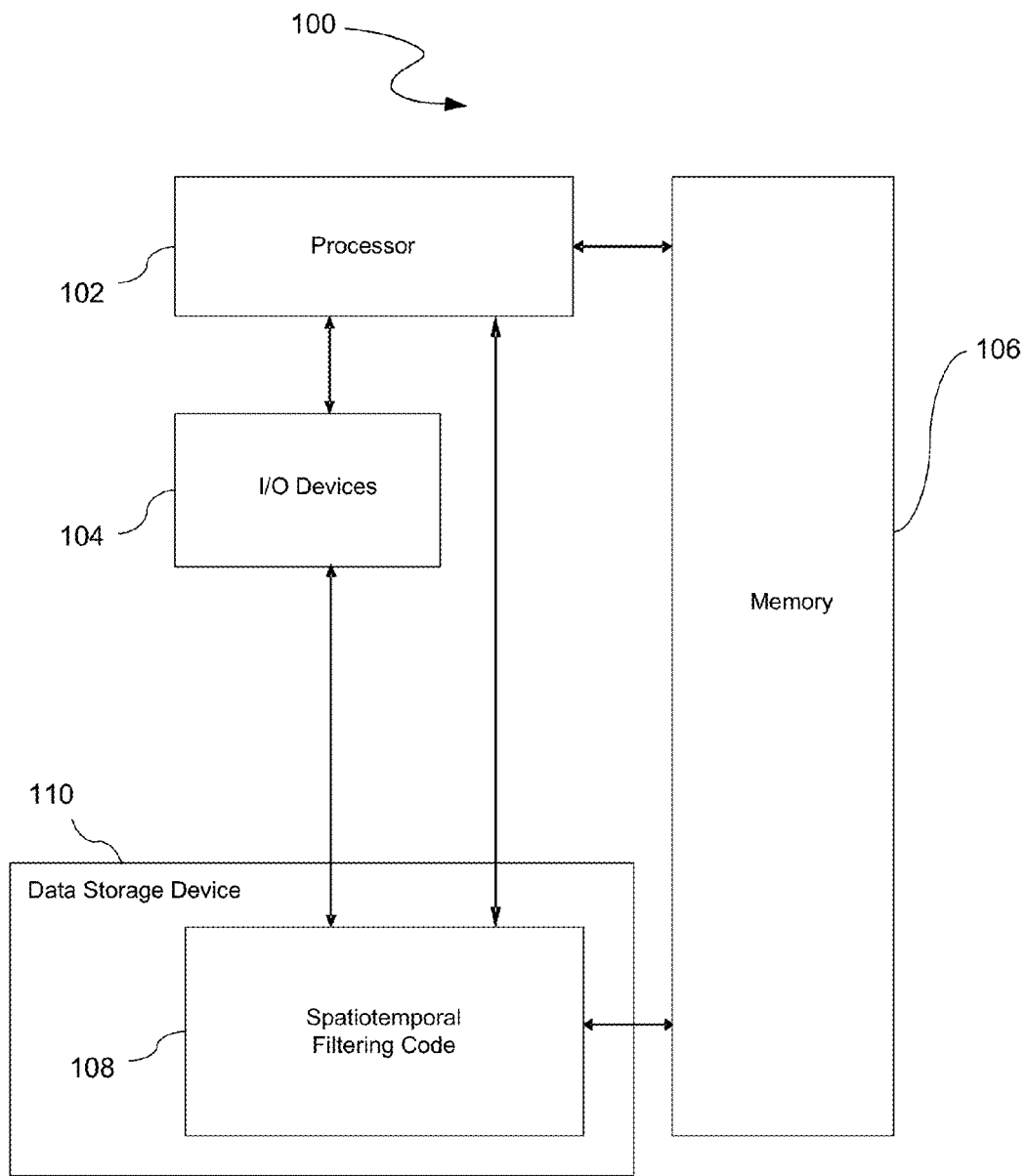
FIG. 1 illustrates a spatiotemporal filtering system that may be utilized to provide temporal filtering of a video sequence.

FIG. 1 illustrates a spatiotemporal filtering system 100 that may be utilized to provide spatiotemporal filtering of a video sequence. In one aspect, the system 100 is implemented utilizing a general purpose computer or any other hardware equivalents. As illustrated, the system 100 comprises a processor 102, a memory 106, e.g., random access memory ("RAM") and/or read only memory (ROM), a set of temporal filtering code 108 that includes instructions for performing temporal filtering, a data storage device 110 that stores the set of spatiotemporal filtering code 108, and various input/output devices 104, e.g., audio/video outputs and audio/video inputs, a receiver, a transmitter, a speaker, a display, an image capturing sensor, e.g., those used in a digital still camera or digital video camera, a motion capture configuration, a clock, an output port, a user input device such as a keyboard, a keypad, a mouse, and the like, or a microphone for capturing speech commands. In one aspect, the set of temporal filtering code 108 is stored in the data storage device 110. The set of temporal filtering code 108 may be a software application such as a mobile application, a desktop application, a web application, or the like. In one aspect, the set of temporal filtering code 108 is loaded from a storage medium, e.g., a magnetic or optical drive, diskette, or non-volatile memory, and operated by the processor 102 in the memory 106 of the system 100. As such, the set of spatiotemporal filtering code 108 and associated data structures of the present disclosure may be stored on a computer readable medium, e.g., RAM memory, magnetic or optical drive or diskette or the like. Various other configurations for the set of spatiotemporal filtering code 108 may be utilized such as firmware stored in a persistent implementation of the memory 106, a hardware implementation having one or more physical devices that are coupled to the processor 102, or a hardware implementation where the processor 102 performs the temporal filtering functionality.

Figure 2:
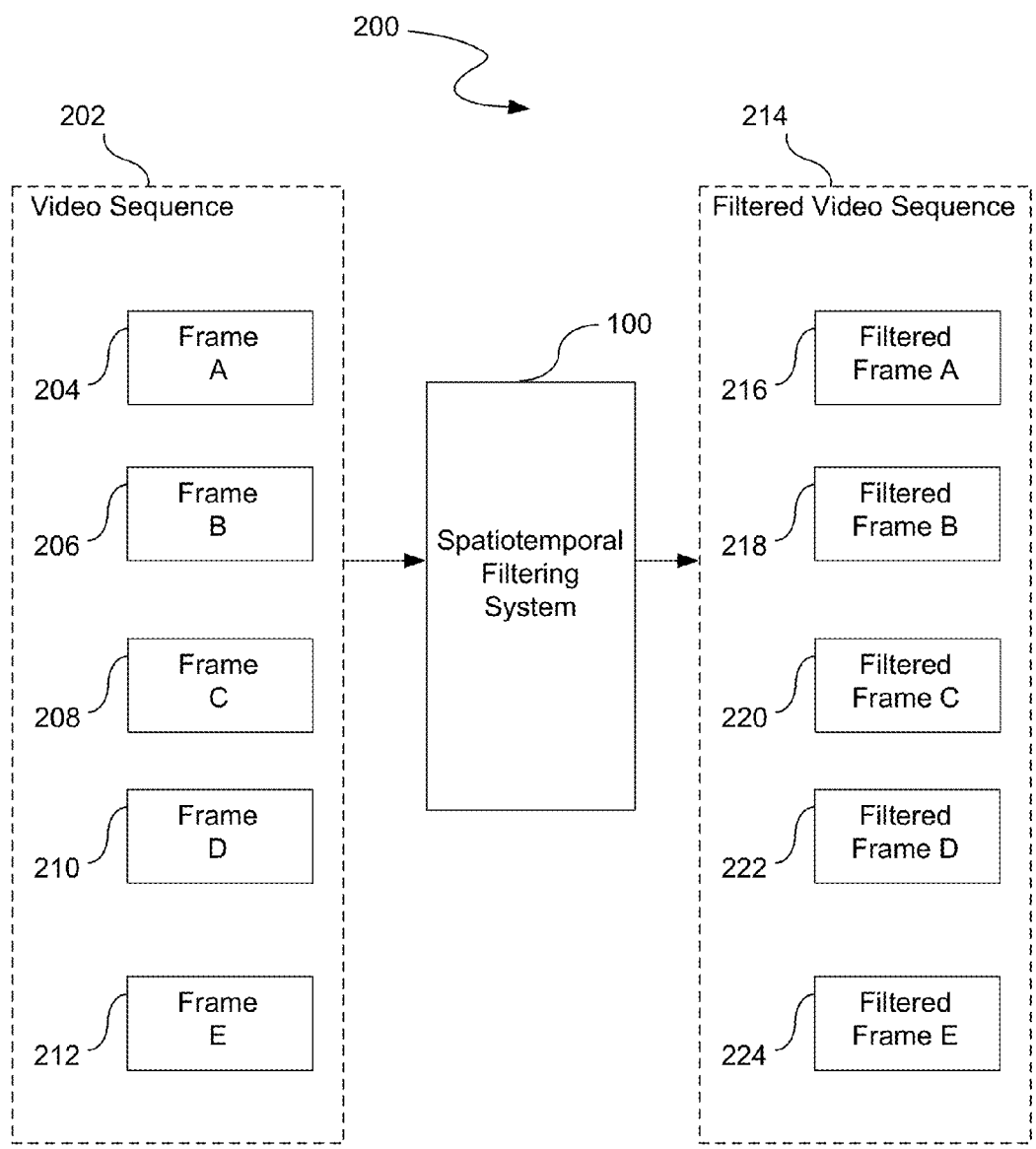
FIG. 2 illustrates a spatiotemporal filtering configuration.

FIG. 2 illustrates a spatiotemporal filtering configuration 200. The spatiotemporal filtering configuration 200 includes the temporal filtering system 100 illustrated in FIG. 1. The temporal filtering system 100 receives a video sequence 202, which includes a plurality of frames such as a frame A 204, a frame B 206, a frame C 208, a frame D 210, and a frame E 212. A relatively small quantity of frames is illustrated for ease of illustration. The spatiotemporal filtering system 100 may receive a large quantity of frames since a typical video sequence for a modern movie or television show would have scene shot lengths of at least hundreds of frames. In one aspect, the video sequence 202 is a scene shot from a larger video that has a plurality of scenes. In another aspect, the video sequence 202 is the entire video. The scene shot may be obtained from a still or moving camera. Alternatively, the scene shot may be generated from a model. As yet another alternative, the scene shot may be generated from both a camera and a model. A scene shot is a complete consecutive sequence of images that are associated with each other. For example, a scene shot may be a part of a movie that involves common actors and objects. The movie may then proceed to a different screen shot that may have different actors and objects.

The spatiotemporal filtering system 100 performs temporal filtering on the plurality of frames in the video sequence 202 to generate a filtered video sequence 214, which includes a plurality of filtered frames such as a filtered frame A 216, a filtered frame B 218, a filtered frame C 220, a filtered frame D 222, and a filtered frame E 224. A relatively small quantity of frames is illustrated for ease of illustration. The spatiotemporal filtering system 100 may generate a large quantity of filtered frames since a typical video sequence for a modern movie or television show would have scene shot lengths of at least hundreds of frames.

The spatiotemporal filtering system 100 analyzes at least one object in the plurality of frames in the video sequence 202. For example, the temporal filtering system detects a plurality of features of the object. The plurality of features may include shapes, surfaces, or the like. The temporal filtering system then utilizes a temporal filter to detect the edges of those features of the object throughout each frame in the plurality of frames of the video sequence 202. In other words, a plurality of frames may be analyzed simultaneously with a temporal filter that performs edge detection.

By determining positions of the features of the object from frame to frame, a motion path is determined. Accordingly, the path of the features of the object throughout the video sequence 202 is accurately determined based on the edge data. By replacing the difficult optimization with a filtering operation that is simplified into multiple one-dimensional filtering operations, memory usage and computational complexity is reduced. The computational complexity of the temporal filtering is approximately O(n) where n is the quantity of pixels. The quantity of operations per pixel is relatively small, which provides for relatively fast filtering of the video sequence 202 with relatively low memory requirements.

In one aspect, a geodesic-distance spatiotemporal filter is utilized. The geodesic-distance temporal filter is a filter that utilizes the geometry of a curved surface to perform filtering calculations. The geodesic-distance temporal filter performs pixel mixing inversely proportional to the distance over the image manifold. Other types of temporal filters may alternatively be utilized.

A formula for error minimization may be expressed as follows: $E(J)=E_{data}(J)+\lambda E_{smooth}(J)$ where $E(J)$ is the error for solution J, $E_{data}$ is the application specific error term, $\lambda$ is a user parameter to control the amount of smoothing, and $E_{smooth}(J)$ enforces smoothness from neighboring frames and/or spatial neighbor location. To avoid costly global optimization, the spatiotemporal filtering system 100 splits up the data and smoothness terms and solves each in series. In one aspect, J is initialized with application specific initial conditions that minimize $E_{data}(J)$ locally. The regularization term $E_{smooth}(J)$ is then replaced by an efficient edge aware filtering operation on J. As a result, smoothness is generated rather than solved for with an optimization.

The temporal filtering system 100 initializes J with sparse feature correspondences computed between two neighboring frames. For instance, particular features of an object may be detected. The particular positions in neighboring frames of those features may then be found. Transformed coordinates are computed for each pixel such that two pixels belonging to the same object have nearby coordinates while pixels that lie on different sides of an object are far apart. In one aspect, a series of one-dimensional box filters is utilized. The one-dimensional box filters are applied along the x, y, and time direction of the images/frames. The same filter is applied along the image axis to all components of a data vector. The one-dimensional box filters are relatively fast and memory efficient as only one dimension is stored.

In one aspect, an initialization of J is followed by at least one iterative improvement. For example, the initialization of J utilizes feature locations, i.e., the difference in feature location from one frame to the other. A motion vector is defined as that difference in feature location from one frame to the other. After determining an initial motion path of the features of an object between the frames of the video sequence 202, the temporal filtering system 100 may iteratively improve the motion path by utilizing x and y coordinates in addition to a time coordinate. The time of the features is determined according to the initial motion path, i.e., the position of the features at particular times of the video sequence 202. Accordingly, the temporal filtering system 100 initially utilizes a spatial filtering approach with x and y coordinates and then iteratively improves the initial estimated motion path with temporal filtering of the motion path with x, y, and time coordinates.

Figure 3:
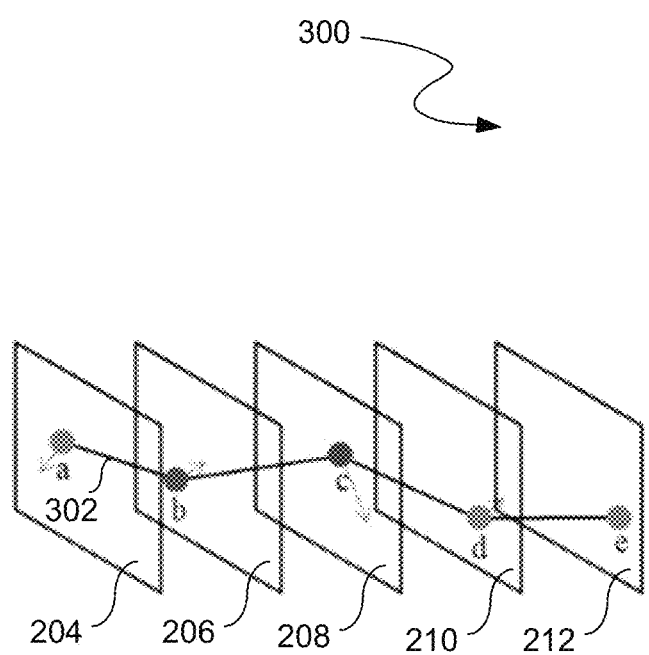
FIG. 3 illustrates a motion path configuration.

FIG. 3 illustrates a motion path configuration 300. The motion path configuration 300 includes a motion path 302 that is generated from the temporal filtering system 100 illustrated in FIGS. 1 and 2 for the plurality of frames 204-212 illustrated in FIG. 2. The temporal filter follows the motion of points a-e of the objects between frames. As a result, information is not incorrectly averaged across object boundaries. Accordingly, the coherence of the image from frame to frame is maintained.

The motion path 302 is a list of pixel data along a path that corresponds to the motion of a scene point over time. The motion path 302 is defined by the motion vectors at each current frame. The motion vectors are indicated by blue arrows in FIG. 3. Filtering in the temporal direction occurs along the paths indicated by the motion vectors. The data itself may be one-dimensional or multi-dimensional. A box filter is then one-dimensionally applied along the motion path, i.e., along the pixel data in the list, for each vector component in the same path.

Figure 4:
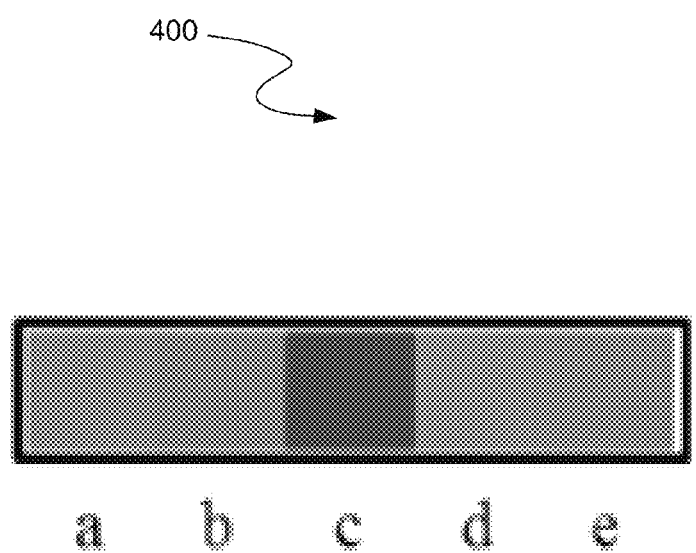
FIG. 4 illustrates a one-dimensional vector that results from box filters being applied to each of the frames illustrated in FIG. 3.

FIG. 4 illustrates a one-dimensional vector 400 that results from the box filters being applied to each of the frames illustrated in FIG. 3. Each scene point, e.g., from scene points a-e in FIG. 3, is then mapped to the one-dimensional vector 400. By having the one-dimensional vector 400 rather than a large quantity of extraneous data, the temporal filtering system 100 illustrated in FIGS. 1 and 2 may then generate a filtered video sequence that accurately follows the motion path 302 of objects through frames of the video sequence 202 illustrated in FIG. 2.

Figure 5:
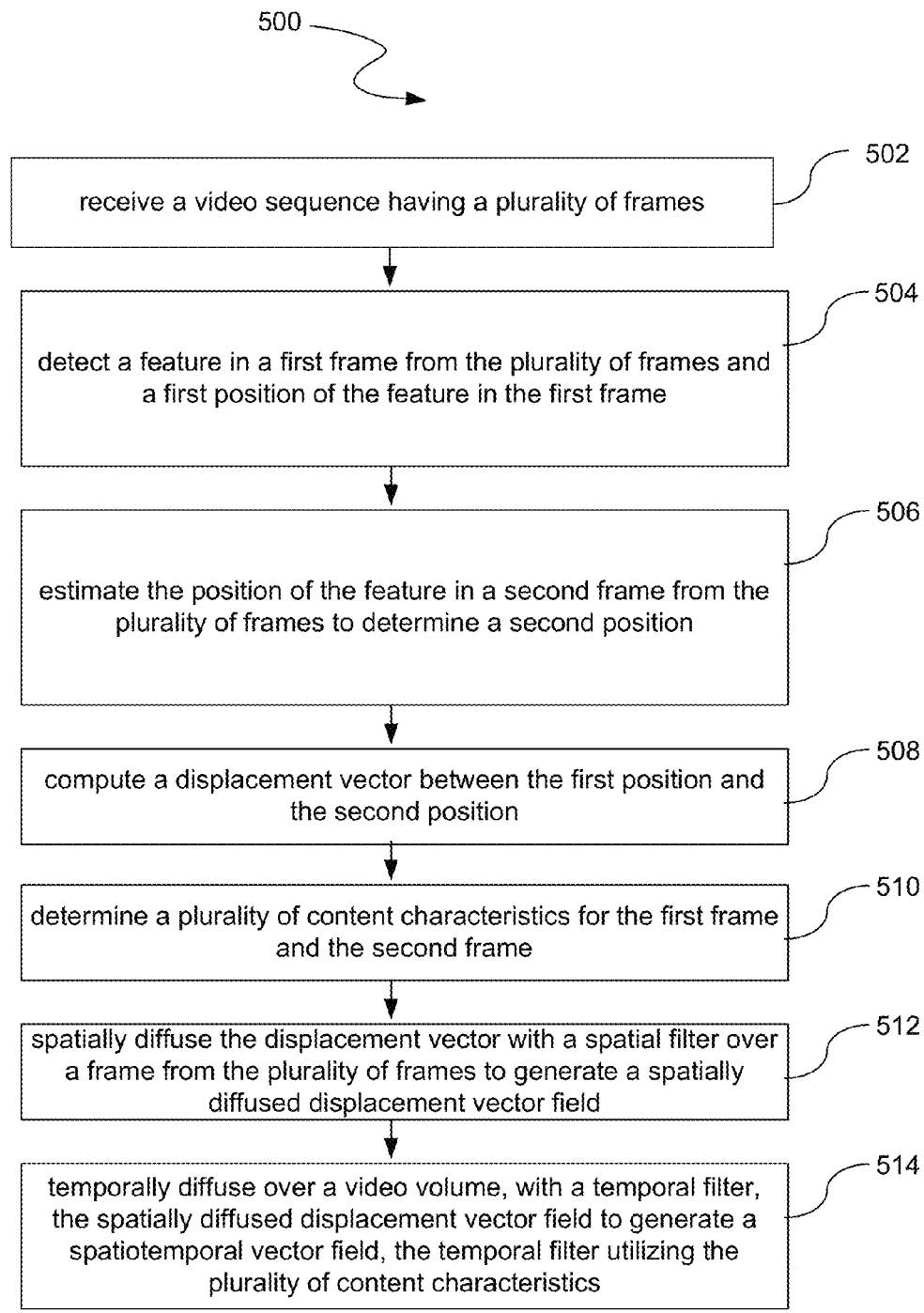
FIG. 5 illustrates a process that may be utilized to provide spatiotemporal filtering of a video sequence.

FIG. 5 illustrates a process 500 that may be utilized to provide spatiotemporal filtering of the video sequence 202 illustrated in FIG. 2. At a process block 502, the process 500 receives a video sequence having a plurality of frames. Further, at a process block 504, the process 500 detects a feature in a first frame from the plurality of frames and a first position of the feature in the first frame. In addition, at a process block 506, the process 500 estimates the position of the feature in a second frame from the plurality of frames to determine a second position. At a process block 508, the process 500 also computes a displacement vector between the first position and the second position. Further, at a process block 510, the process 500 determines a plurality of content characteristics for the first frame and the second frame. In addition, at a process block 512, the process 500 spatially diffuses the displacement vector with a spatial filter over a frame from the plurality of frames to generate a spatially diffused displacement vector field. The spatial filter utilizes the plurality of content characteristics. At a process block 514, the process 500 also temporally diffuses over a video volume, with a temporal filter, the spatially diffused displacement vector field to generate a spatiotemporal vector field. The temporal filter utilizes the plurality of content characteristics.

In one aspect, the spatially diffused displacement vector field is temporally diffused along a motion path determined by the spatially diffused displacement vector field. The spatially diffused displacement vector field may be temporally diffused in other configurations without a motion path.

The plurality of content characteristics may include a variety of characteristics. As an example, the plurality of content characteristics may include a plurality of edges. Accordingly, the temporal filter may be an edge-aware filter. Further, the plurality of content characteristics may be calculated or manually inputted by a user.

The spatiotemporal filter may comprise a plurality of one-dimensional filters. For example, the spatiotemporal filter may comprise a one-dimensional x axis filter, a one-dimensional y axis filter, and a one-dimensional time axis filter. Alternatively, the spatiotemporal filter may comprise a two-dimensional spatial filter and a one-dimensional temporal filter. For example, the spatial filter may be a two-dimensional x and y axes filter and the temporal filter may be a one-dimensional time axis filter. In one aspect, the spatial filter and the temporal filter are weighted with a confidence value that is assigned to the feature.

In another aspect, the process 500 may be utilized without computing the displacement vector. In other words, the process 500 may receive a displacement vector that has already been computed. The process 500 may receive a video sequence having a plurality of frames, receive a spatiotemporal displacement vector field, receive data, determine a plurality of content characteristics for a first frame and a second frame in the plurality of frames, spatially diffuse the data with a spatial filter a frame to generate a spatially diffused data field such that the spatial filter utilizes the plurality of content characteristics, and temporally diffuse over a video volume, with a temporal filter, the spatially diffused data field along a motion path determined by the spatiotemporal displacement vector field to generate a spatiotemporal data field such that the temporal filter utilizes the plurality of content characteristics. The data that is selected may be optical flow, depth/disparity estimation, colorization, low resolution data upscaling, scribble propagation, or the like.

The temporal filtering approach provided herein may be utilized for a variety of image-based processing applications. For example, temporal filtering may be utilized with optical flow, depth upsampling, scribble propagation, disparity estimation, visual saliency, and/or other image-based processing applications.

Figure 6:
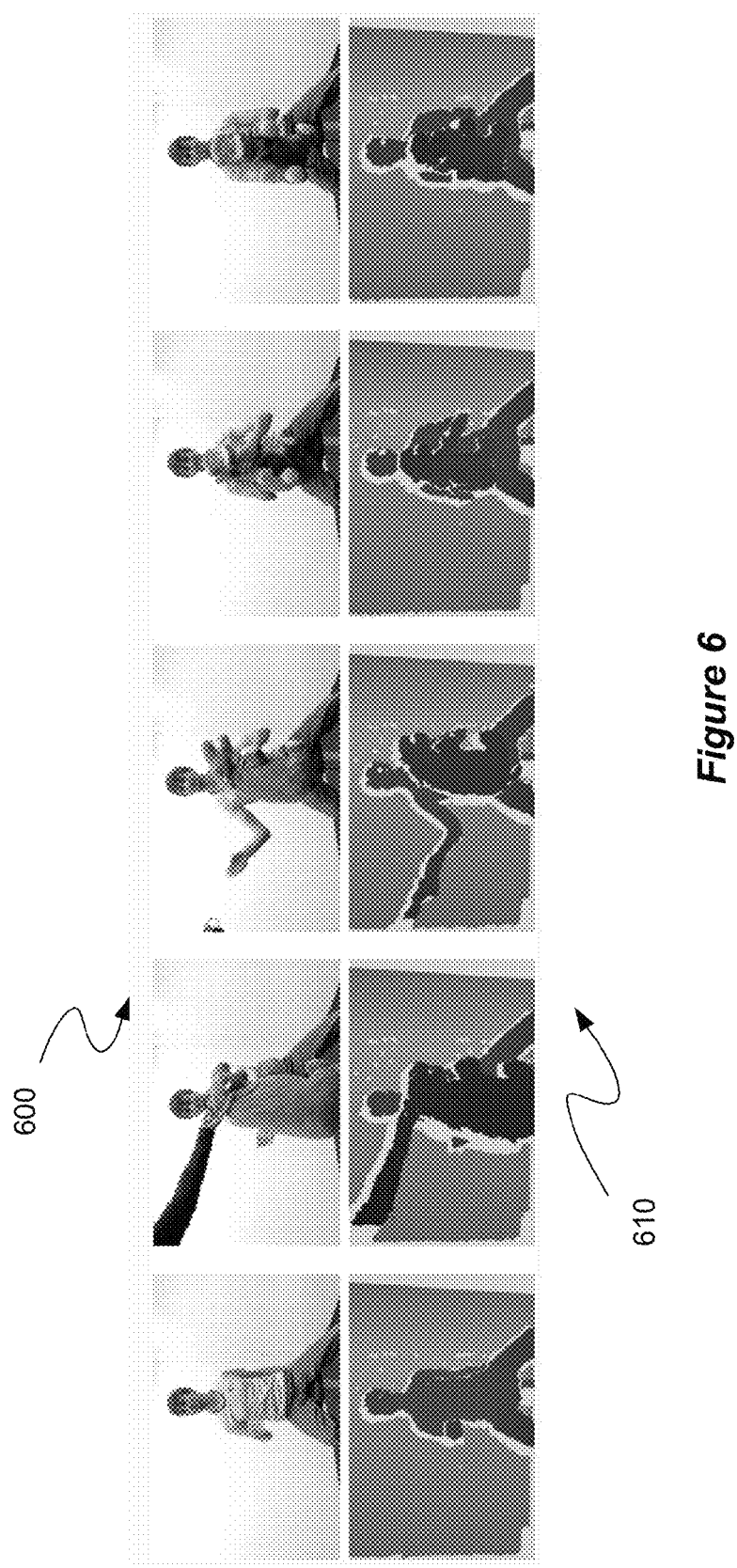
FIG. 6 illustrates a sample video sequence and a depth video sequence.

FIG. 6 illustrates a sample video sequence 600 and a depth video sequence 610. The video sequence 600 has a plurality of frames. The depth video sequence 610 is associated as data with the sample video sequence 600. The depth video sequence 610 is sparse, i.e., has a lot of artifacts and holes. The artifacts and holes particularly appear around object boundaries.

Figure 7:
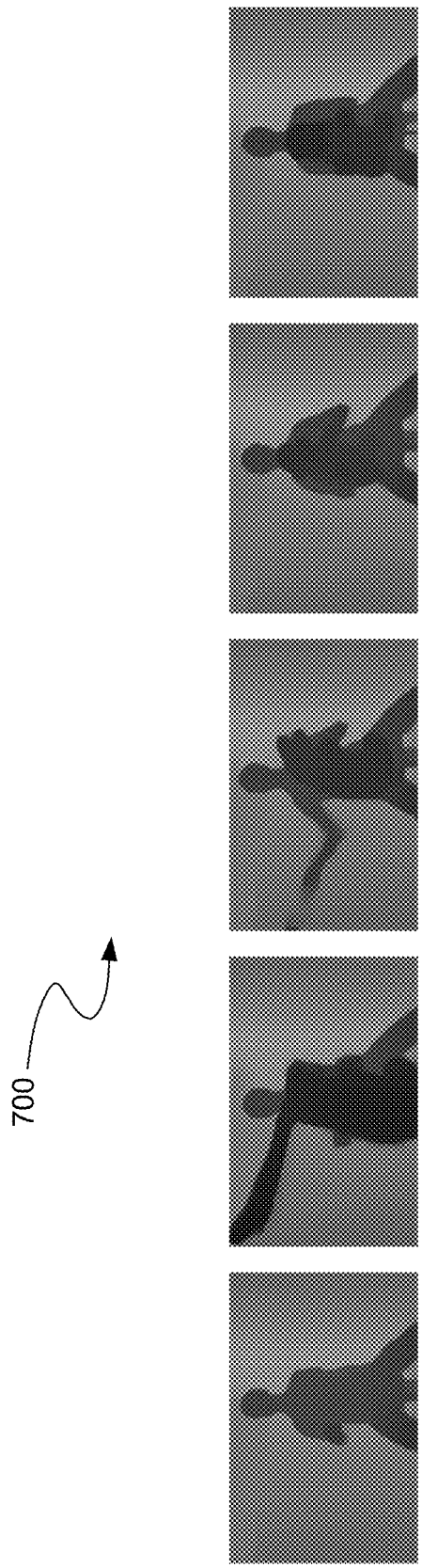
FIG. 7 illustrates a sample filtered video sequence.

FIG. 7 illustrates a sample filtered depth video sequence 700. The sample filtered depth video sequence 700 is the depth video sequence that results from application of spatiotemporal filtering to the sample depth video sequence 610 in FIG. 6 using the sample video sequence 600 in FIG. 6. The noticeable artifacts and holes have been removed in the depth output of the filtered video sequence 700. Such results may be achieved for a large quantity of frames. A relatively small quantity of frames is illustrated for ease of illustration. Further, similar artifact removal may be achieved in other image-based processing applications.

Figure 8:
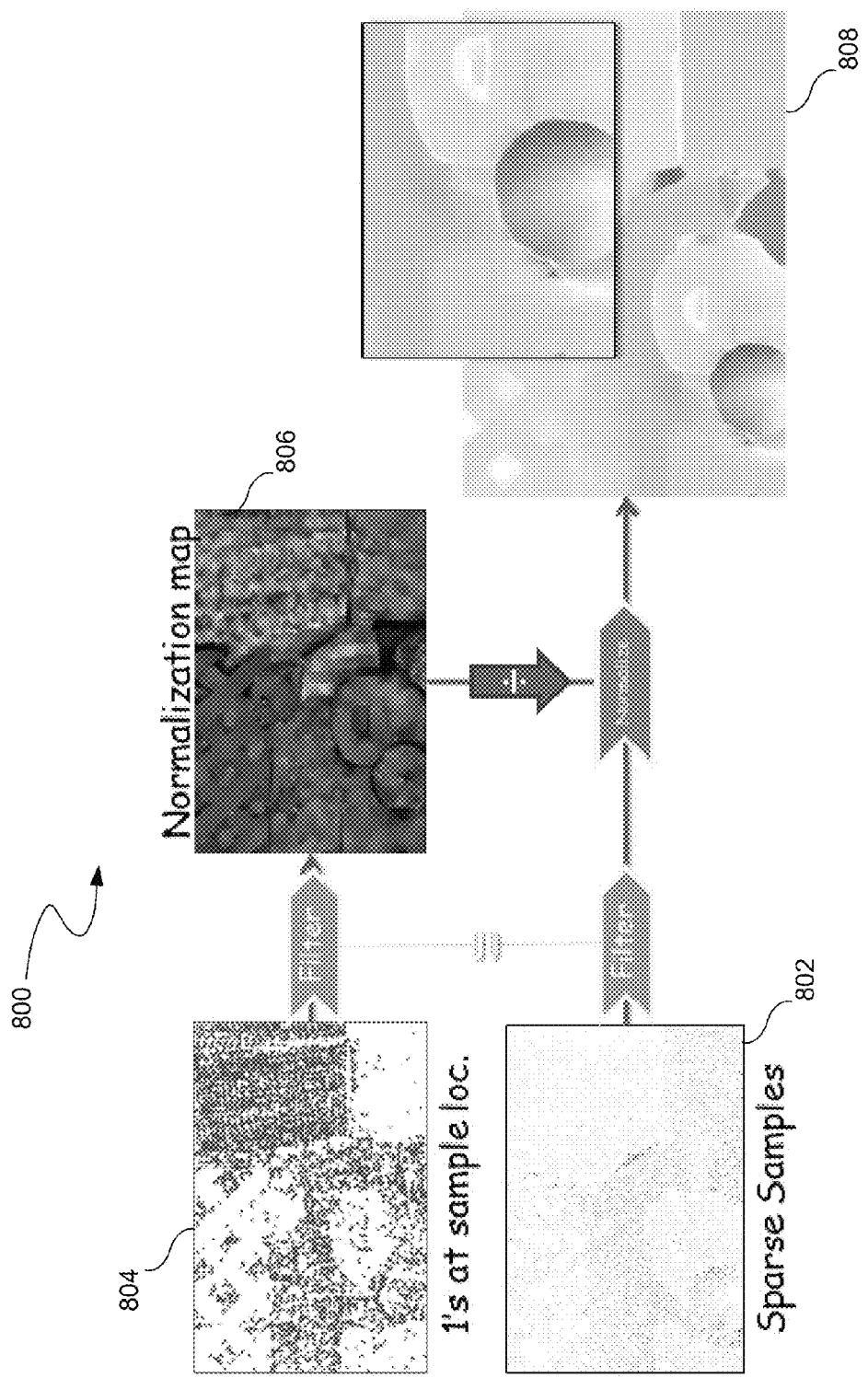
FIG. 8 illustrates a normalization and filtering configuration.

FIG. 8 illustrates a normalization and filtering configuration 800. An initial sparse sample 802 is filtered. The ones at all sample locations are simultaneously filtered with the same filter. As a result, a normalization map 806 is generated. The normalization map 806 indicates the distance a pixel is from the initial sparse sample 802. The normalized and filtered result 808 is then generated.

In one aspect, confidence aware filtering is utilized. The unconfident regions are content awarely filled in from more confident neighbor regions. Accordingly, the iterative filtering is modified to consider a per pixel confidence. The confidence map may be initialized by the confidence of the initial samples.

Figure 9:
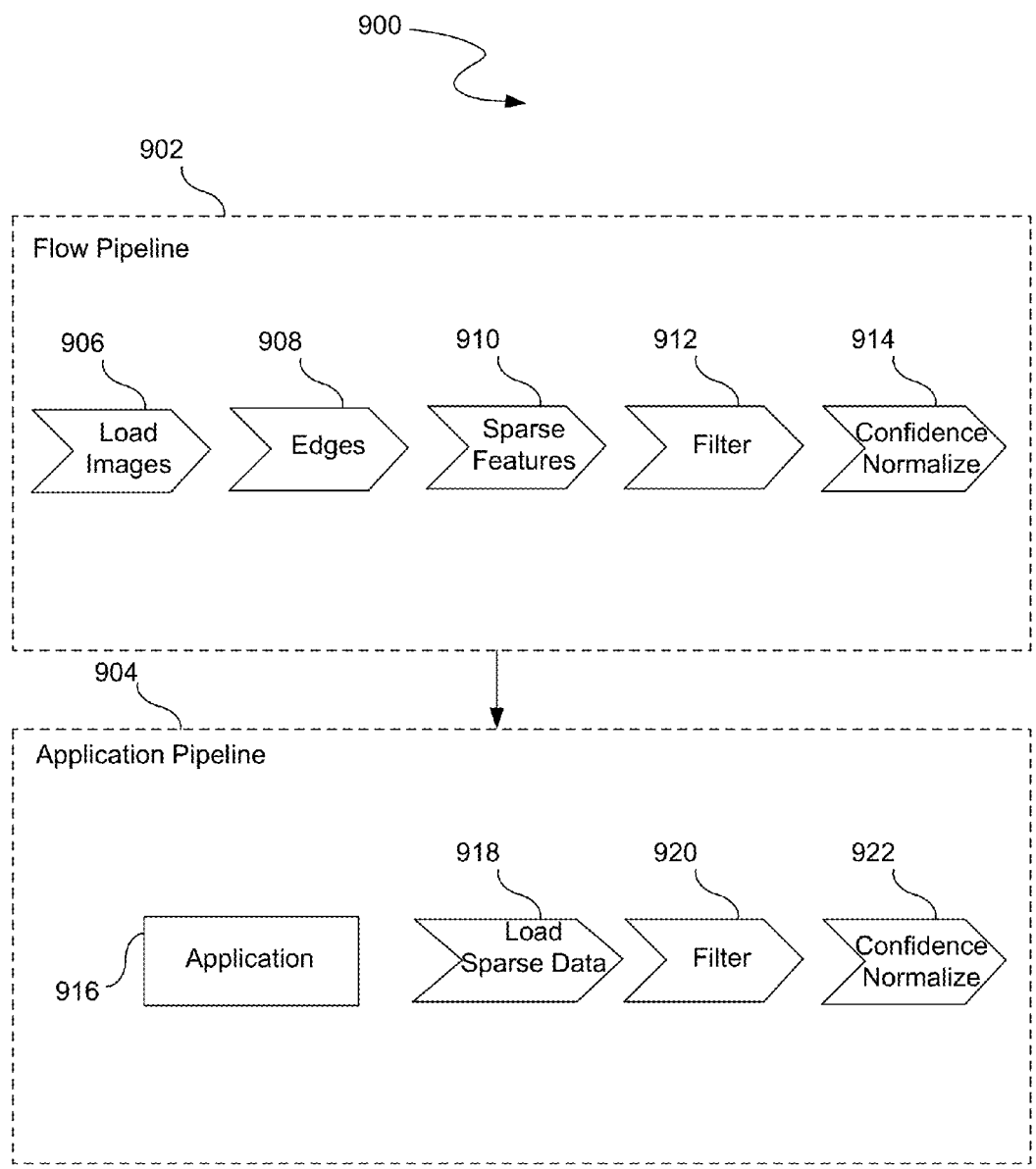
FIG. 9 illustrates a pipeline that may be utilized for filtering and normalization.

FIG. 9 illustrates a pipeline 900 that may be utilized for filtering and normalization. The pipeline 900 includes a flow pipeline 902 and an application pipeline 904. The flow pipeline 902 may be utilized as a basis for other pipelines such as the flow pipeline 904. The flow pipeline 902 loads images at a block 906, detects edges at a block 908, determines sparse features at a block 910, performs filtering at a block 912, and performs confidence weighting and normalization at a block 914. The flow pipeline 902 may then be utilized for other applications. Accordingly, the flow pipeline 902 is utilized for the application pipeline 904. The application pipeline utilizes an application 916, loads sparse data at a block 918, performs filtering at a block 920, and performs confidence weighting and normalization at a block 922. The application specific sparse data may be loaded or computed. Examples of application specific sparse data include user strokes for colorization, camera motion sensor data, or any other input map that may be filtered.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:
   receive a video sequence having a plurality of frames;
   detect a feature in a first frame from the plurality of frames and a first position of the feature in the first frame;
   estimate the position of the feature in a second frame from the plurality of frames to determine a second position;

compute a displacement vector between the first position and the second position;
determine a plurality of content characteristics for the first frame and the second frame;
spatially diffuse the displacement vector with a spatial filter over a frame from the plurality of frames to generate a spatially diffused displacement vector field, the spatial filter utilizing the plurality of content characteristics; and
temporally diffuse over a video volume, with a temporal filter, the spatially diffused displacement vector field to generate a spatiotemporal vector field, the temporal filter utilizing the plurality of content characteristics.

2. The computer program product of claim 1, wherein the spatially diffused displacement vector field is temporally diffused along a motion path determined by the spatially diffused displacement vector field.

3. The computer program product of claim 1, wherein the plurality of content characteristics comprises a plurality of edges.

4. The computer program product of claim 1, wherein the plurality of content characteristics is calculated.

5. The computer program product of claim 1, wherein the plurality of content characteristics is received through as at least one input.

6. The computer program product of claim 1, wherein the spatial filter is a two-dimensional filter.

7. The computer program product of claim 1, wherein the spatial filter comprises a one-dimensional x axis filter and one-dimensional y axis filter.

8. The computer program product of claim 1, wherein the temporal filter comprises a one-dimensional time axis filter.

9. The computer program product of claim 1, where the spatial and temporal filters are weighted with a confidence value that is assigned to the feature.

10. The computer program product of claim 1, wherein the temporal filter is an edge-aware filter.

11. A computer program product comprising a computer readable storage device having a computer readable program stored thereon, wherein the computer readable program when executed on a computer causes the computer to:
receive a video sequence having a plurality of frames;
receive a spatiotemporal displacement vector field;
receive data;
determine a plurality of content characteristics for a first frame and a second frame in the plurality of frames;
spatially diffuse the data with a spatial filter a frame to generate a spatially diffused data field, the spatial filter utilizing the plurality of content characteristics; and
temporally diffuse over a video volume, with a temporal filter, the spatially diffused data field along a motion path determined by the spatiotemporal displacement vector field to generate a spatiotemporal data field, the temporal filter utilizing the plurality of content characteristics.

12. The computer program product of claim 11, wherein the data is selected from the group consisting of optical flow, depth/disparity estimation, colorization, low resolution data upscaling, and scribble propagation.

13. A method comprising:
receiving a video sequence having a plurality of frames;
detecting a feature in a first frame from the plurality of frames and a first position of the feature in the first frame;
estimating the position of the feature in a second frame from the plurality of frames to determine a second position;
computing a displacement vector between the first position and the second position;
determining a plurality of content characteristics for the first frame and the second frame;
spatially diffusing the displacement vector with a spatial filter over a frame from the plurality of frames to generate a spatially diffused displacement vector field, the spatial filter utilizing the plurality of content characteristics; and
temporally diffusing over a video volume, with a temporal filter, the spatially diffused displacement vector field to generate a spatiotemporal vector field, the temporal filter utilizing the plurality of content characteristics.

14. The method of claim 13, wherein the spatially diffused displacement vector field is temporally diffused along a motion path determined by the spatially diffused displacement vector field.

15. The method of claim 13, wherein the plurality of content characteristics comprises a plurality of edges.

16. The method of claim 13, wherein the plurality of content characteristics is calculated.

17. The method of claim 13, wherein the plurality of content characteristics is received through as at least one input.

18. The method of claim 13, wherein the spatial filter is a two-dimensional filter.

19. The method of claim 13, wherein the spatial filter comprises a one-dimensional x axis filter and one-dimensional y axis filter.

20. The method of claim 13, wherein the temporal filter comprises a one-dimensional time axis filter.

21. The method of claim 13, where the spatial and temporal filters are weighted with a confidence value that is assigned to the feature.

22. The method of claim 13, wherein the temporal filter is an edge-aware filter.

23. A system comprising:
a processor that receives a video sequence having a plurality of frames, detects a feature in a first frame from the plurality of frames and a first position of the feature in the first frame, estimates the position of the feature in a second frame from the plurality of frames to determine a second position, computes a displacement vector between the first position and the second position, determines a plurality of content characteristics for the first frame and the second frame, spatially diffuses the displacement vector with a spatial filter over a frame from the plurality of frames to generate a spatially diffused displacement vector field, and temporally diffuses over a video volume, with a temporal filter, the spatially diffused displacement vector field to generate a spatiotemporal vector field, the spatial filter utilizing the plurality of content characteristics, the temporal filter utilizing the plurality of content characteristics.

24. The system of claim 23, wherein the spatially diffused displacement vector field is temporally diffused along a motion path determined by the spatially diffused displacement vector field.

25. The system of claim 23, wherein the plurality of content characteristics comprises a plurality of edges.

26. The system of claim 23, wherein the plurality of content characteristics is calculated.

27. The system of claim 23, wherein the plurality of content characteristics is received through as at least one input.

28. The system of claim 23, wherein the spatial filter is a two-dimensional filter.

29. The system of claim 23, wherein the spatial filter comprises a one-dimensional x axis filter and one-dimensional y axis filter.

30. The system of claim 23, wherein the temporal filter comprises a one-dimensional time axis filter.

31. The system of claim 23, where the spatial and temporal filters are weighted with a confidence value that is assigned to the feature.

32. The system of claim 23, wherein the temporal filter is an edge-aware filter.

* * * * *